United States Patent

Durteste et al.

[15] 3,657,698

[45] Apr. 18, 1972

[54] SIGNALLING SUPERVISION UNIT

[72] Inventors: Bernard Pierre Jean Durteste, Sevres; Jean-Claude Gadre, Boulogne-Billiancourt; Jean Francois Pierre Julien Loisel, Versailles, all of France

[73] Assignee: International Standard Electric Corporation, New York, N.Y.

[22] Filed: Feb. 19, 1970

[21] Appl. No.: 12,698

[30] Foreign Application Priority Data

Feb. 19, 1969 France ................................6904113

[52] U.S. Cl. .............................................340/146.1, 325/41

[51] Int. Cl. ........................................................G08c 25/00

[58] Field of Search ..................340/146.1; 235/153; 325/41; 179/15 AE, 15 BS; 178/69 R

[56] References Cited

UNITED STATES PATENTS

| | | | |
|---|---|---|---|
| 3,335,224 | 8/1967 | Meslener et al. | 340/146.1 X |
| 3,343,125 | 9/1967 | Lender | 340/146.1 |
| 3,461,426 | 8/1969 | Lender | 340/146.1 |

*Primary Examiner*—Charles E. Atkinson

*Attorney*—C. Cornell Remsen, Jr., Walter J. Baum, Percy P. Lantzy, J. Warren Whitesel, Delbert P. Warner and James B. Raden

[57] ABSTRACT

A signalling supervision unit for pulse code modulation systems provides for detecting and interpreting signalling signals by comparing an incoming stream of signals with a stored state corresponding to the signals expected and storing any differences detected during the comparison.

4 Claims, 25 Drawing Figures

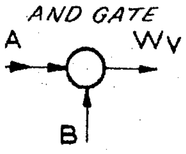
Fig.1.a
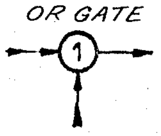
Fig.1.b
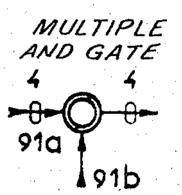
Fig.1.c
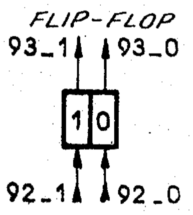
Fig.1.d
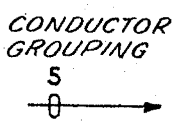
Fig.1.e
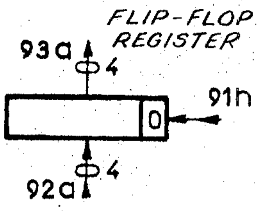
Fig.1.f
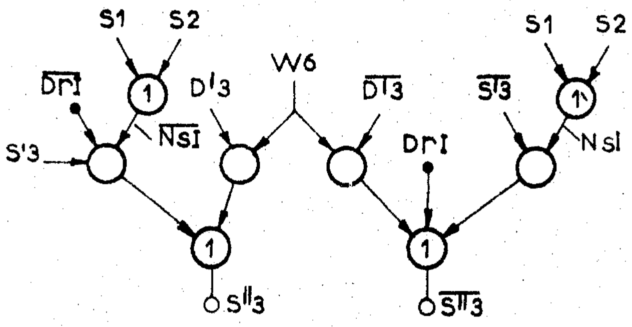
FIG. 7
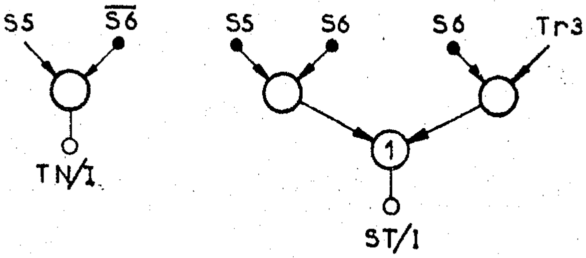
FIG. 8

Patented April 18, 1972 3,657,698

5 Sheets-Sheet 4

SIGNALLING SUPERVISION UNIT

The present invention concerns circuits enabling the detection of signalling signals in a time division multiplex data switching central exchange and more particularly in a central exchange of this type operating in Pulse Code Modulation "PCM."

Detection circuits for the signalling signals will be described, by a way of example, in their application to a PCM system presenting the following features:

repetition period or frame $TR = 125$ microseconds;

number of channels per trunk or junction: $m = 24$;

number of binary digits constituting the binary message transmitted on a channel $p = 8$;

a pulse or message signal is transmitted when the digit corresponding is 1;

Each central exchange of the network includes an independant local clock supplying the following signals:

channel time slot signals referenced V1 to V24 which divide each frame into 24 channel time slots of equal duration. Each one of these signals has a duration $tp = 5.208$ microseconds.

digit time slot signals numbered $m1$ to $m8$ which divide each channel time slot into eight time slots of equal duration. Each one of these digit time slots thus defined is used more particularly for the transmission in a serial form, from the central exchange, of one of the digits of the message.

elementary time slot signals which divide each digit time slot into basic time slots $a$, $b$, $c$, $d1$ and $d2$ the durations of which will be defined in the course of the description.

Together these signals define the time HC of the central exchange.

The transmission of the messages between two central exchanges A and B is carried out on a trunk or junction which comprises two lines reserved respectively for the transmission of A towards B and for the transmission of B towards A.

For the requirements of transmission and of switching, each one of the junctions ending at a central exchange is identified by a particular code known as a junction code. On each junction, each one of the m channels is identified by the code of channel time slot at which it is received, the homologuous channels of the two lines constituting a junction identified by the same code.

The setting up or the termination of a connection between two subscribers requires knowledge of a certain number of pieces of information the whole of which constitutes the signalling. In the case of a "PCM" network, this information may be transmitted in different ways, therefore the detection and interpretation of this information will also be different. We will describe herein, the detection circuits for signalling signals in a PCM system in which the signalling signals are, for example, constituted by the first digits of the messages of the channels of the first and third frames of a group of four successive frames, each frame comprising 24 channels. In this type of signalling, the first digits of the channel messages of the second and fourth frames are used for transmitting, for example, either the synchronising code or data. It is clear that the invention is applicable also to the case where the signalling signals are constituted by any digit whatsoever of the channel messages belonging to two of the four frames.

When the message signals are transmitted from the central exchange B towards the central exchange A, they are locked, in the sending central exchange B, on the time scale (digit time slot signals) set up by the local clock of this central exchange. If we consider, by way of example, that the transmission comprises an uninterrupted series of digits 1 or message signals, this means that a signal is transmitted at each digit time slot defined by the clock of the central exchange B.

But, it is known, that in a transmission, the time positions of the message signals are affected by disturbances which may be classified as slow drift, phase jitter, and synchronization loss.

In order to suppress the effect of disturbances, it is provided to make available, at the input of each central exchange, synchronization circuits the description of which is contained in the U.S. patent application Ser. No. 5,381, filed Sept. 12, 1969 by M.J. Herry and A. Lejay.

Since the transmission of messages in the central exchange is carried out in a parallel form, a digit time slot being reserved to the transmission of a message of $p$ digits, the synchronization circuits are common to a group of $p$ circuits of incoming junctions. At the output of the synchronization circuits of a group, the messages are available in a memory comprising $g = p \times m = 192$ lines of $p$ digits. Before writing in this group data memory the first digits of the messages of the second and fourth frames have been switched towards the circuits able to interpret them; while the first digits of the messages of the first and third frames are written in the group data memory at the same time as the message of which they are part. In the the case of messages of the second and fourth frames, the first digit is not written so that at the output of the group data memory, the signalling digit of one channel is the same for two successive messages of the said channel. During the processing of each message read in the group data memory, the first digit is sent to the circuits of detection for the signalling which is the object of the present invention.

The object of the present invention is thus to provide circuits which enable the detection and interpretation of the signalling signals received on P-junctions of a group.

Summarizing the present invention relates to a time division multiplex data switching central exchange employing pulse code modulation in which the operations are controlled by a data processing machine. In an associated exchange, the messages received from the P-junctions of a group are stored in a group data memory having $pxm/2 = g/2$ lines where m is the number of channels per junction. The detection and interpretation circuits for the signalling signals comprise means for reading in a cyclic way the group data memory. A signalling memory having $g/2$ lines is provided, where each line contains information required for the processing of the signals to be received and to be sent on two channels belonging to a group of P-junctions. In addition there are provided first cyclic reading means for reading the lines of the signalling memory and second cyclic reading means controlled by the data processing machine for reading one line of the signalling memory between the reading periods of the first cyclic reading means. An interpretation logic circuit is coupled to receive the signalling digits supplied by the cyclic reading means of the group data memory and also the information supplied by the first and second cyclic reading means of the signalling memory. The exchange further includes first cyclic writing means for modifying, if required, the information contained in the signalling memory in relation with the signals supplied by the interpretation logic circuit, second writing means controlled by the data processing machine for modifying the information contained in the signalling memory between the writing instants of the first writing means, and a clock circuit supplying the different cyclic signals.

The present invention is used mainly in data transmission systems operating in pulse code modulation.

The above mentioned and other features and objects of this invention will become apparent by reference to the following description taken in conjunction with the accompanying drawings in which:

FIG. 1*a* to 1*f* illustrate the symbols used in the drawings;

FIGS. 2*a* to 2*g* illustrate the clock signals of the PCM central exchange;

FIGS. 3*a* to 3*g* illustrate the diagrams of the frame signals,

Figure 5:
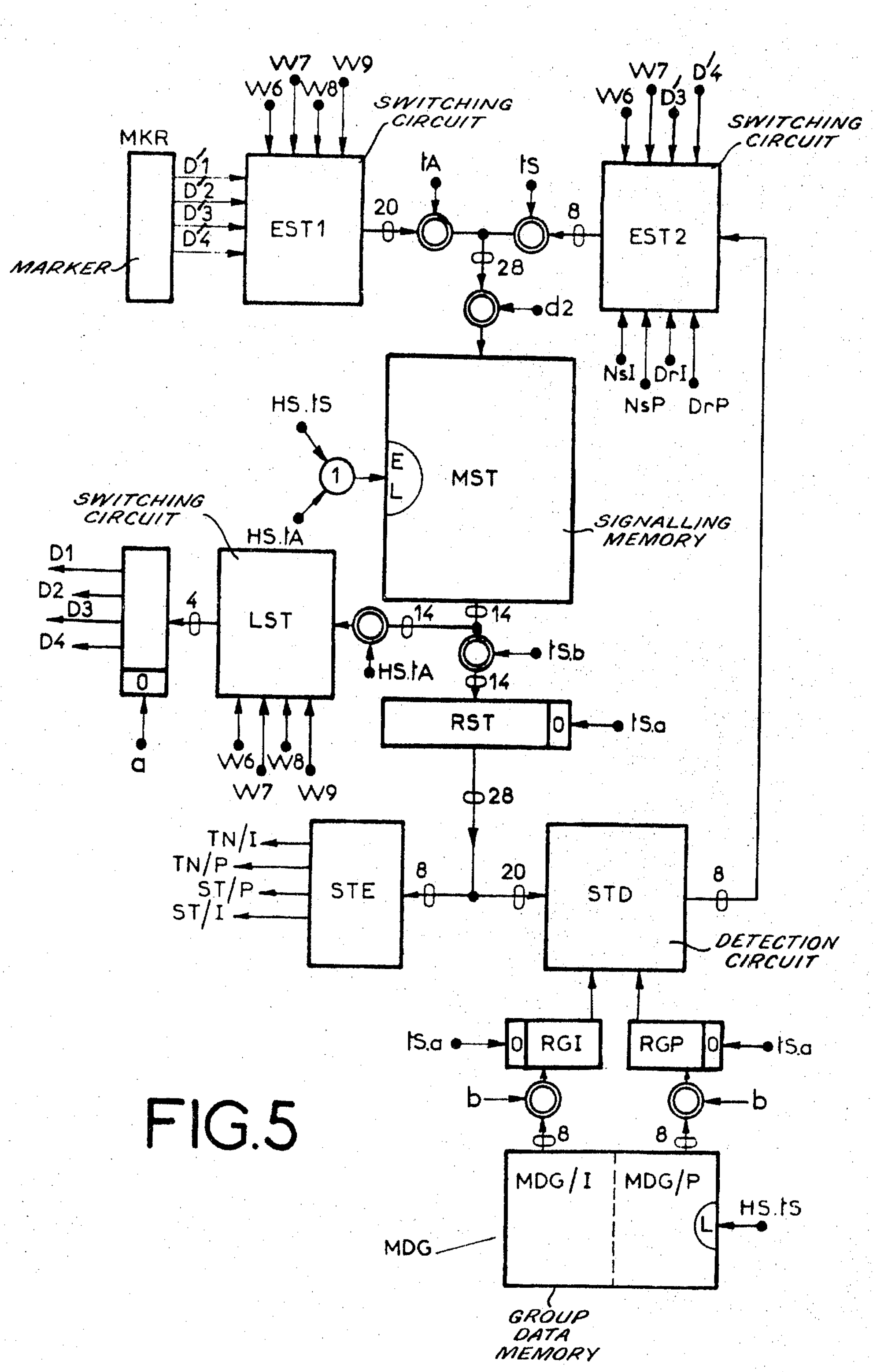
FIG. 5 represents the diagram of the circuit according to the present invention.
Figure 6:
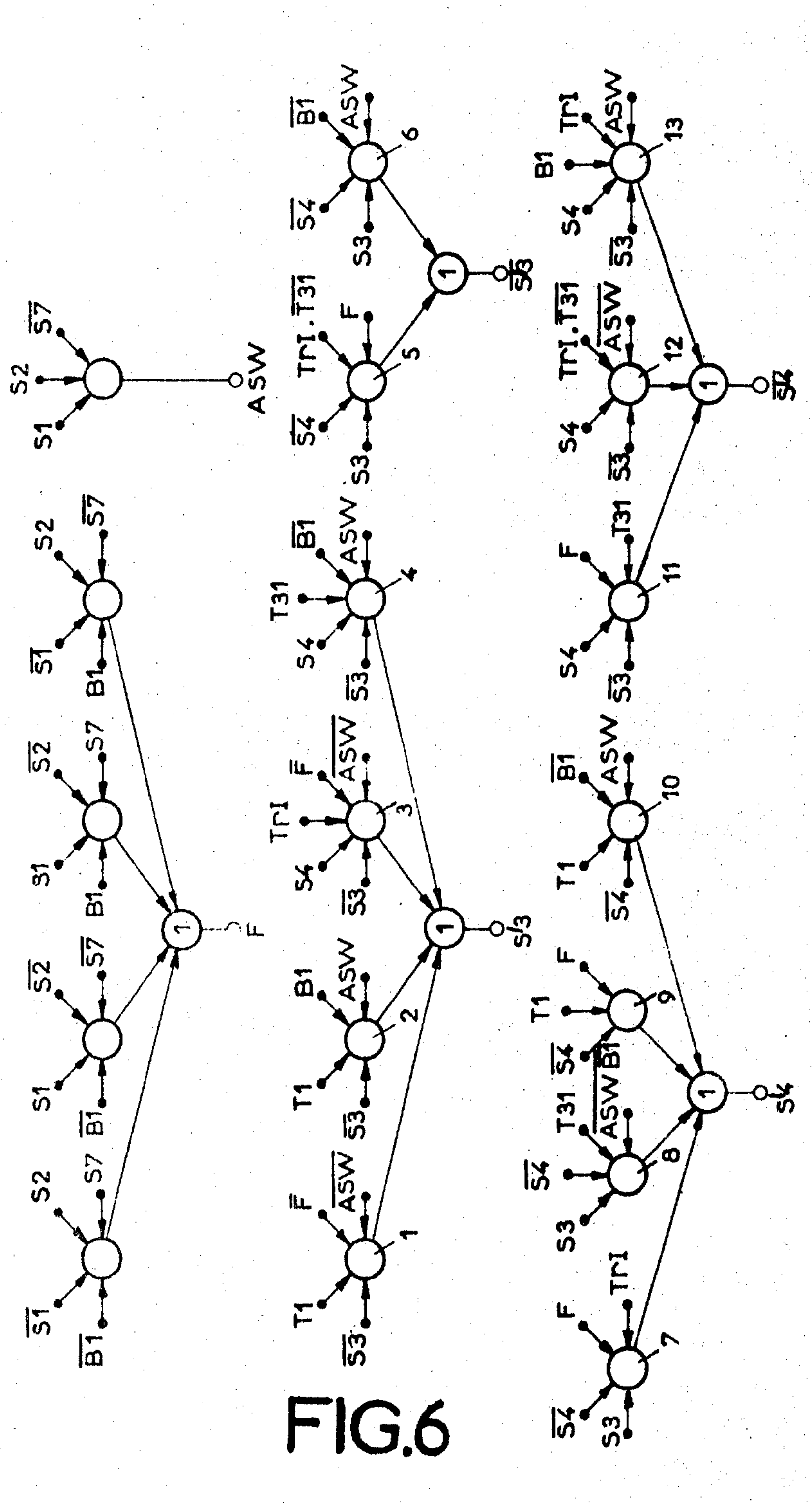

FIG. 6 illustrated the detection circuit of the signalling STD of FIG. 5 in what concerns the channels of the odd junctions;

FIG. 7 illustrates the modification on circuit of the digit S3 in what concerns the channels of the odd junctions; this circuit constitutes a part of the circuit EST2 of FIG. 5;

FIG. 8 illustrates the detection circuit STE of the signalling to be sent of FIG. 5 in what concerns the channels of the odd junctions;

FIGS. 1*a* to 1*f* give the meaning of certain symbols used particularly in the drawings of the present patent:

FIG. 1*a* illustrates a coincidence electronic gate called a simple AND circuit, which supplies a positive signal on its output when its inputs, represented by arrows touching the circle, receive simultaneously a positive signal. If we call A and B the signals which are present on each of the two input terminals, this circuit produces the logical condition noted A.B.

FIG. 1*b* illustrates a mixing electronic gate, called OR circuit, which supplies to a positive signal its output when a positive signal is applied at least on one of the input terminals represented by the arrows touching the circle. If one calls C and D the signals which are present at each one of the two input terminals, this circuit produces the logical condition noted C + D.

FIG. 1.c illustrates a multiple AND circuit, i.e., comprising, in the case of the example, four AND circuits; one of the input terminals of which is connected to each one of the conductors 91*a* and the second input terminal of which is connected to a common conductor 91*b*.

An input of a AND circuit will be said to be activated or energised when a signal is applied on the said input and the AND circuit is conductive if all its inputs are simultaneously activated.

FIG. 1*d* illustrates a bistable circuit or "flipflop" to which a control signal is applied on one of its inputs 92-1 or 92-0 in order to set it respectively to the 1 state or to the 0 state. A voltage of the same polarity as the control signals is present, either on the output 93-1 when the flipflop is in the 1 state, or on the output 93-0 when it is in the 0 state. If the flipflop is referenced B*l*, the logical condition characterizing the fact that it is in the 1 state will be written B*l*, the one characterizing the fact that it is in the 0 state will be written $\overline{Bl}$.

FIG. 1*e* illustrates a group of several conductors, five for the example considered.

FIG. 1*f* illustrates a flipflop register. In the example shown in the figure, it comprises four flipflops the 1 inputs of which are connected to the conductors of group 92*a* and the 1 outputs of which are connected to the group of the conductors 93*a*. The digit 0 located at one end of the register means that this latter is reset or clear when a signal is applied to the conductor 91*h*.

In the following description reference to a signal preceded by the letter C is used to designate the binary code the decoding of which supplies the said signal. Thus CV*l* designates the code corresponding to the signal V*l*.

Last, it will be noted, that in FIGS. 5–8 the electronic gates (AND circuits, OR circuits) do not bear references. In fact, each one of these gates is identified without ambiguity, in the description, by the logical equation describing the function it performs and by the number of the figure, the reference of each elementary signal applied to it being shown at the proximity of the corresponding input.

Thus, the AND circuit of FIG. 1*a* would be defined as the logical circuit supplying a signal W*v* for the logical condition A.B (FIG. 1*a*).

FIGS. 2*a* to 2*g*, represents the diagrams of the clock signals of the PCM central exchange and the Table 1 on page 8 provides the definition of the clock signals.

A time multiplex data switching central exchange operating in pulse code modulation or PCM, is described generally in the U.S. patent application Ser. No. 7,477, filed February 2, 1970 by J. G. Dupieux et al.

Figure 4:
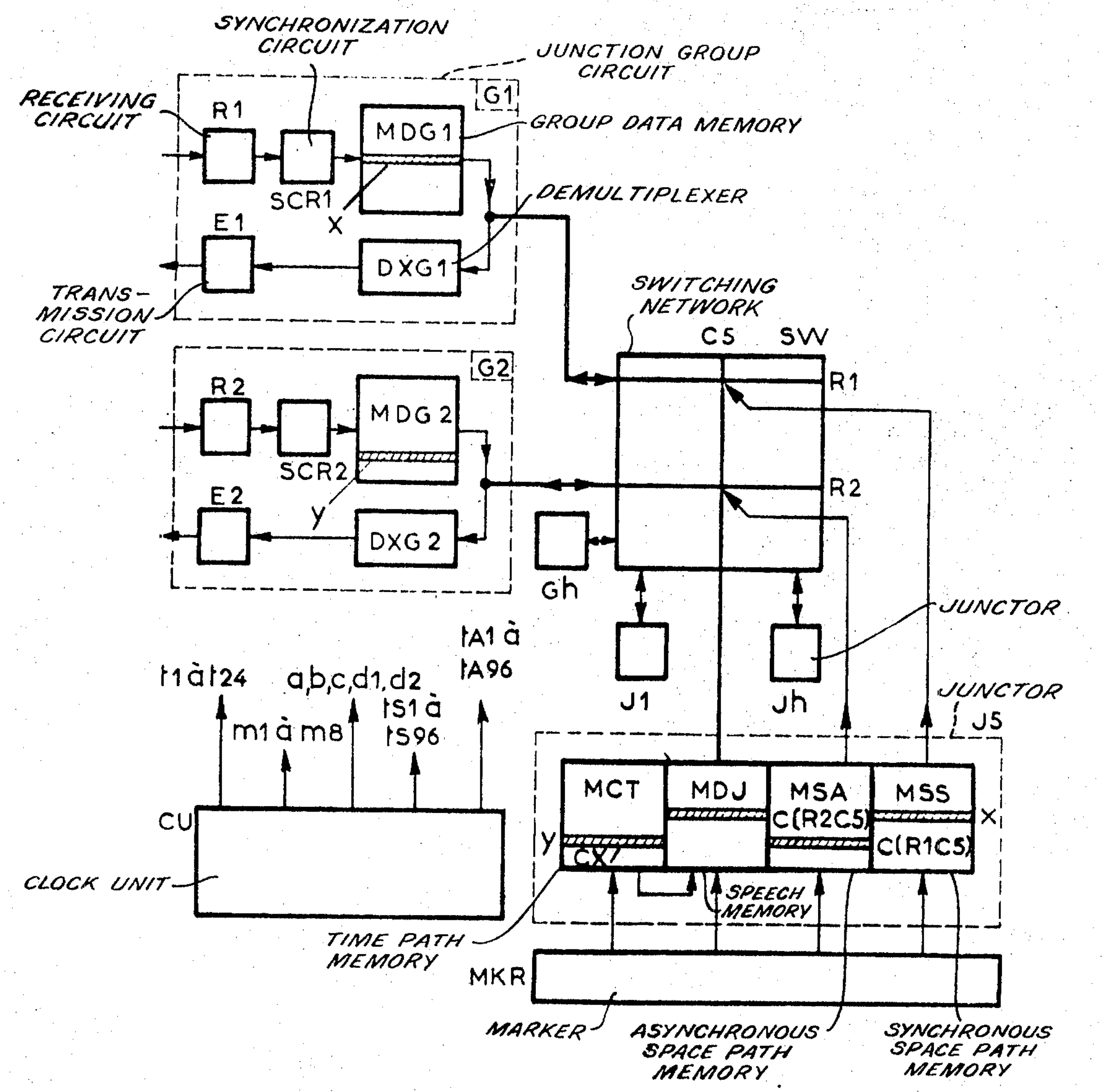
FIG. 4 represents the diagram of a switching stage operating in pulse code modulation.

This improved switching central exchange comprises (FIG. 4);

a switching network SW shown under a matrix form and comprising for example *h* rows R and *h* columns C. Only the rows R1, R2 and the column C5 have been shown on the figure and the corresponding cross-points have been referenced R1C5 and R2C5.

*h* circuits of group of junctions G*l* to G*h*;

*h* junctors J*l* to J*h*;

a marker circuit MKR having access to all the junctors. The marker circuit is in fact a data processing machine provided for setting up the communication between two channels ending at the central exchange. Owing to the number of operations to be carried out for setting up the communications simultaneously, it is usually provided to associate peripheral units to the data processing machine, the said peripheral units carrying out certain operations; the same goes for the detection circuits of the signalling signals which are the object of the present invention. In the continuation of the present description and in the claims, the terms of marker circuits, data processing machine and computer may be used differently.

a clock unit CU which supplies the signals defined in table 1 and the FIGS. 2*a* to 2*g*.

Each junctions group circuit such as Gl comprises:

a receiving circuit R1 of the messages received over $p = 8$ incoming lines;

a synchronization circuit SCR*l*;

a group data memory MDG1 comprising $g = p \times m = 192$ lines; this memory is selected on a cyclic way under the control of the signals tS;

a demultiplexing circuit DXG*l* of the messages coming from the switch SW;

a transmission circuit E*l* of the messages to which are connected $p = 8$ outgoing lines;

Each junctor such as J5 comprises mainly a certain number of memories of $g/2 = 96$ lines, which are:

TABLE 1

Characteristics of the PCM system and of the clock signals (exchange time base HS)

| Symbol | Unit duration | Cycle duration | | Figure |
|---|---|---|---|---|
| TR | 125 μs | | Duration of the repetition period or frame (sampling frequency:8kc). | 2.a |
| m | | | Number of channels in a junction (m=24). | |
| VI, V2 . . . V24 | ≃5, 2 μs | 125 μs | Channel time slot | 2.a |
| p | | | Number of digits of a message and number of junctions in a group (p=8). | |
| ml, m2 . . . m8 | 650 ns | 5,2 μs | Digit time slot | 2.b |
| tl . . . t96 | 1,300 ns | 125 μs | Base time slot | 2.c |
| Ct | | | The set of 96 base time slot codes | |
| tS | 650 ns | | Synchronous time slots | 2.d |
| tA | 650 ns | | Asynchronous time slots | 2.e |
| tS1 . . . tS96 | 650 ns | 125 μs | Interlaced sets of signals tS and tA | 2.f |
| tA1 . . . tA96 | 650 ns | 125 μs | | |
| a, b, c, d | 162, 5 ns | 650 ns | Fine time slot signals | 2.f |
| dl, d2 | ≃81 ns | 162, 5 ns | Ultra-fine time slot signals dividing a signal (d) into 2 equal time slots. | 2.g |
| Ct.tS | | | Cyclical selection at synchronous time slots tS. | |
| Ct.tA | | | Cyclical selection at asynchronous time slots tA. | |

a speech memory MDJ;

a time path memory MCT;

a synchronous space path memory MSS;

an asynchronous space path memory MSA;

The switching network of FIG. 4 is provided in order to establish connections between h groups of junctions G*l* to G*h* comprising each one $g = 192$ channels, each connection being set up through a junctor among within the "*h*" groups. Such a connection is constituted by two half-connections which connect the junctor to the incoming channel and to the outgoing channel ; one of these half-connections being set-up at a synchronous time slot *t*S and the other one at an asynchronous time slot *t*A the order numbers of which are generally different. A connection necessitates the carrying out of a time switching in the junctor and of two space switchings (one per half-connection) in the switching network SW.

The time switch is constituted by the combination in a junctor of a speech memory MDJ and of a time path memory MCT. The addressing of the speech memory is carried out in a cyclic way under the control of the signals *t*S and in an acyclic way at the time *t*A under the control of the address code supplied by the time path memory MCT the selection of which is also cyclic.

The space switch is constituted by the switch SW with electronic cross-points controlled either by synchronous space path memories MSS when it is required to set up a synchronous half-connection, or by asynchronous space path memories MSA when it is required to set up an asynchronous half-connection. Such a switch enables to carry out the connection between groups of different junctions such as G1 and G2.

The time switching will be quickly described with respect to FIG. 4 for a connection between the channel *x* of the group G*l* (half-connection G*l*:*t*S*x*) and the channel *y* of the group G2 (half-connection G2:*t*A*y*), this connection using the junctor J5 (abbreviation of the connection G*l*:*t*S*x*/J5/G2:*t*A *y*).

The marker circuit MKR allocates to this connection the line x of the junctor J5 and writes on the line *y* of the memory MCT the code C*x* defining the address *x* of the memory MDJ. The marker circuit writes also in the line *x* of the synchronous space path memory MSS the code C(R1C5) permitting the selection in the switch SW of the cross-point R1C5. It writes also in the line *y* of the asynchronous space path memory MSA the code C(R2C5) permitting the selection in the switch SW of the cross-point R2C5.

At the time slot *t*S*x*, the information contained in the lines *x* of the memories MDJ, MDG1 and MSS permits the setting up of the half-connection G*l*:*t*S*x*. This latter is made by a transfer in both directions of data between the junctor J5 and the group Gl, vizus, first the transfer of information contained in the line *x* of the memory MDJ towards the demultiplexing circuit DXG*l*, afterwards the transfer of the contents of the line *x* of the memory MDG*l* to the line *x* of the memory MDJ. It will be observed that two messages are written in each line of the memory MDG*l*, one of the messages is transferred during the synchronous time slot *t*S*x* (synchronous half-connection) and the other one is transferred during the asynchronous time slot *t*A*x* (asynchronous half-connection).

At the time slot *t*S*y*, the line *y* of the memory MCT is selected next and the code C*x* which is read controls again the selection at the time slot *t*A*y* of the line *x* of the memory MDJ ; the line *y* of the memory MSA is also selected at the time slot *t*S*y* and the code C(R2C5) permits the closing at the time *t*A*y* of the cross-point R2C5 used for the half-connection G2:*t*A*y*. This latter consists first in a transfer of the contents of the line x of the memory MDJ in the multiplexing circuit DXG2 then in a transfer of a message of the line *y* of the memory MDG2 to the line *x* of the memory MDJ.

It is therefore seen that the time switch enables a match to be made between the time position of the incoming and of the outgoing channels by delaying the information received from G*l* from the time slot *t*S*x* to the time slot *t*A*y* and by delaying the one received from G2 from the time slot *t*A*y* to the time slot *t*S*x*.

As has been mentioned with relation to FIG. 4, the group data memory MDG is read in a cyclic way at $g/2 = 96$ synchronous time slots. But, this memory receives *g* messages per cycle TR, so that each reading must enable to read two messages. This group memory is organized in such a way as at each reading one has staticized on the output registers RG1 and RGP (FIG. 5) two messages corresponding the one to a channel of one odd junction (register RGI) and the other one to the homologous channel of an even junction (register RGP). The message of a channel of an odd junction is processed during a synchronous time slot *t*S whereas the message of a channel of an even junction is processed during an asynchronous time slot *t*A.

In the particular case described where the signalling signals are constituted by the first digits of the messages, the first digit B*l* of each message is on the one hand sent to the circuit of FIG. 5 herein, and on the other hand, written in the speech memory MDJ of the junctor at the same time as the corresponding message.

The signalling signals are of three types :

either constituted only by digits 1, or constituted only by digits 0, or constituted by digits 1 and 0 alternatively.

Each type of signal corresponds to a signalling state and is transmitted permanently till the time when a new state is sent. Therefore, the aims of the circuit of the present invention include the detection of modifications of the signal transmitted. In order to detect these modifications, the method used consists in scanning a number N of consecutive signalling digits associated with the same channel and to detect a modification or change if two consecutive digits corresponding to the expected state have not been detected. Thus, if the expected signal is all 1 (or all 0), a modification is detected only if two 1 (or two 0) consecutive over N consecutive digits have not been received. In the same way, if the expected signal is constituted by alternated 1 and 0, a modification is detected only if all 1 or all 0 have been received.

Figures 2A, 2B, 2C, 2D, 2E, 2F, 2G:
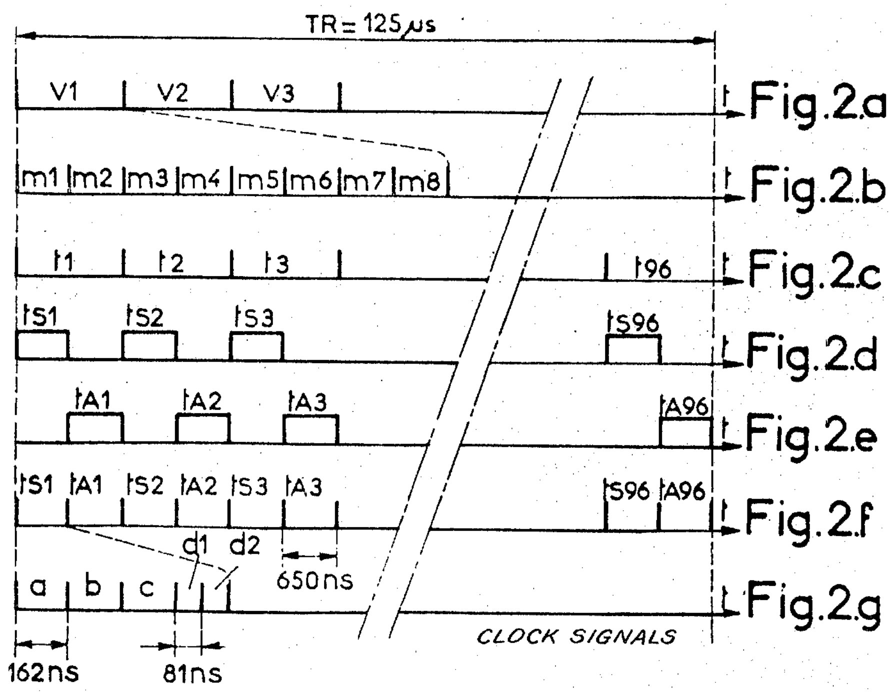
Figures 3A, 3B, 3C, 3D, 3E, 3F, 3G:
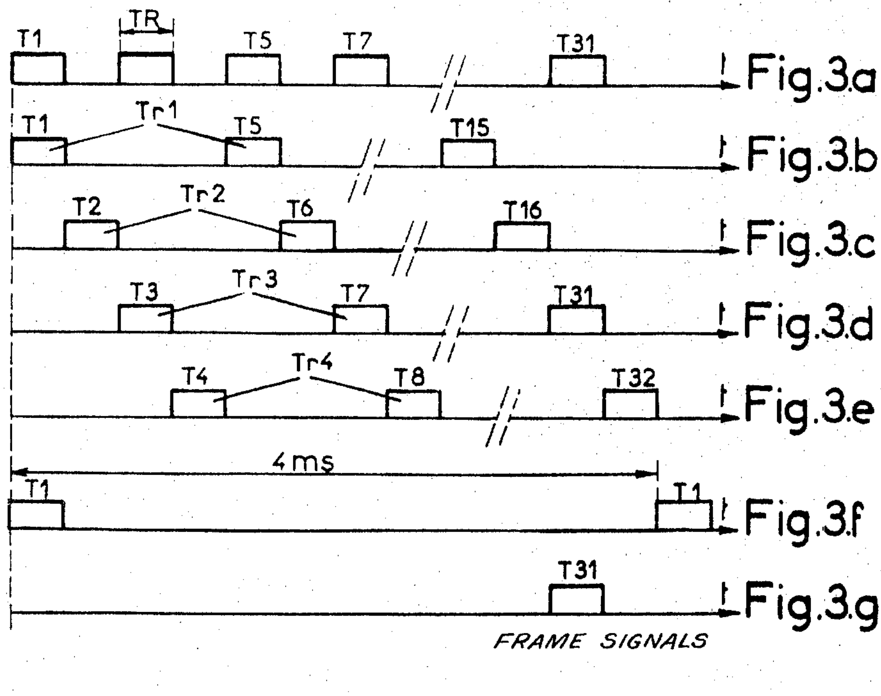

In the particular example described, the number N is equal to 16 ; since the signalling digit appears every two frames, the detection is carried out during a time interval corresponding to 32 frames, vizus four milliseconds. The FIG. 3*a* gives the succession of the odd frame signals T*rl* referenced T*l* to T3*l* appearing during an interval of 4 milliseconds, the diagrams of FIGS. 3*b* to 3*e* gives the succession of the signals of the first (T*r*1), the second (T*r*2), the third (T*r*3) and the fourth (T*r*4) frames appearing during the above mentioned interval ; last, the diagrams of the FIGS. 3*f* and 3*g* represent respectively the signals of the first frame T*l* and of the next to last frame T3*l* of the whole set of 32 frames.

FIG. 5 illustrates the detection circuit for the signalling digits. This circuit comprises a memory MST in which are written the information required for the processing of the signalling digits of *g* channels, a logical circuit STD permitting the interpretation of the digit received in relation to the information contained in the memory MST, a circuit EST2 permitting modification of certain information of the memory MST in relation to the results of the interpretation, a first switching circuit LST permitting selective reading of certain words of one line of the memory MST, a second switching circuit EST*l* permitting selective writing of words in one line of the memory to MST, a circuit STE enabling a comparison, in relation with information read in the memory, signalling signals to be sent on an outgoing channel.

The memory MST comprises $g/2 = 96$ lines, each line containing the information required for the processing of the signalling digits of the two channels among $g = 192$ channels of one group, one of the two channels belonging to an odd junction of the group of junctions and the other belonging to an even junction.

Table 2 gives the meaning of the seven digits S1 to S7 used for processing the signalling associated to the channels of the odd junctions of a same group. Seven other digits are required for processing the signalling associated to the channels of the even junctions of said group. These fourteen digits are divided into four words referenced W6 and W8 for the odd junctions, W7 and W9 for the homologous words processing the channels of even junctions.

TABLE 2

| Word | W6 | | | | W8 | | |
|---|---|---|---|---|---|---|---|
| Digits | D1 S1 | D2 S2 | D3 S3 | D4 S4 | D1 S5 | D2 S6 | D3 S7 |
| Meaning | Expected state | | Counting | | Signalling to send | | Incoming or outgoing |
| | Free | | Change | | Send all 0 | | |
| | 0 | 1 | 1 | 1 | 0 | 0 | 1 |
| | Busy | | No change | | send all 1 | | Incoming |
| | 1 | 0 | 0 | 0 | 1 | 1 | |
| | Answer | | | | send oil | | |
| | 1 | 1 | Intermediary states | | 0 | 1 | 0 |
| | | | | | Send tone and all 0 | | Outgoing |
| | 0 | 0 | | | | | |
| | | | | | 1 | 0 | |

The two first digits S1 and S2 of the word W6 (or of the word W7) give the expected signalling state ; in the case of an incoming line, in which case S7 = 1, two states are foreseen : the one, code 01 during which we must receive all 0 and which corresponds for instance to the clear state of the line of the calling subscriber (clear forward) ; the other, code 10, during which we must receive all 1 and which corresponds for instance to the seize state of the line of the calling subscriber (seize forward). In the case of an outgoing channel (S7 = 0), three states are foreseen ; the first one, code 01, during which we must receive all 1 and which corresponds for instance to the free state of the line of the called subscriber ; the second, code 10, during which we must receive all 0 and which corresponds for example to the busy state of the line of the called subscriber ; last the third, code 11, during which we must receive alternated digits 1 and 0 and which corresponds to the fact that the called subscriber is off-hook. The code 00 is used for meaning that we must not take into account the signalling received on the channel, the channel being for instance out of service.

The two other digits S3 and S4 of the word W6 (or of the word W7) are used for indicating that the signalling received is different (change 11) or not (not change 00) from the expected signalling. The two other codes 10 and 01 correspond to intermediary states used during the interpretation of the digits received ; their meaning will be explained during the description of the operation of the circuit.

The two first digits of the word W8 (or of the word W9) are used for indicating signalling to send on an outgoing channel. This information is written by the marker circuit.

The marker circuit has access to four words W6 to W9, either for reading them or for writing them ; on the contrary, the interpretation circuit of the signalling STD of the FIG. 5 has access for writing only for the digits S3 and S4 of the word W6 (or of the word W7). The digits of these words W6 to W9 will be referenced D1 to D4 during the reading and D'1 to D'4 during the writing.

The operation of the circuit of FIG. 5 will be described now ; at each synchronous time slot *t*S, a line, for example, the line *x*, of the group data memory MDG and of the signalling memory MST associated to the said group is selected. The channel message of an odd junction is stored in the register RGI and the channel message of an even junction is stored in the register RGP. The two flipflops of these registers corresponding to the signalling digits are connected to the detection circuit STD of the signalling. The fourteen digits of the line *x* of the memory MST are stored in the register RST at the fine time slot *ts.b ;* the signals corresponding to the digits S5 and S6 of the words W8 and W9 are applied to the circuit STE which detects one of the four signalling states to send ; the signals corresponding to the other digits are applied to the circuit STD and permit to the interpretation of the digit received. Since the signalling digits appear only during the odd frames, it is necessary to take them into account only during the duration of these frames, this being obtained by the signals T*rl* and T*r*3 (FIGS. 3*b* and 3*d*). Besides, since the detection is carried out over 16 consecutive digits, it is necessary also to know the beginning and the end thereof by means of the signal T*l* corresponding to the first odd frame of a set of sixteen odd successive frames and of the signal T3*l* corresponding to the sixteenth odd frame of the same set.

The results of this detection permit the modification, if required of the digits S3 and S4 of the words W6 and W7. This modification is carried out through a circuit EST2 which receives also the digits D'3 and D'4 of the words W6 and W7 supplied by the marker circuit MKR. When the two channels considered at the time tSx are such as one has $\overline{S1}.\overline{S2}$ (signals N*s*I and N*s*P) and that the corresponding junctions are out of service (signals D*r*I and D*r*P), one writes $\overline{S3}.\overline{S4}$ (no modification).

The access to the memory MST through the marker circuit is carried out during the asynchronous time slots *t*A during which a line of memory is selected for reading and/or writing. During the reading, the signals of the fourteen digits are applied to a switching circuit LST which chooses the digits D1 to D4 corresponding to one of the words W6 to W9 requested by the marker circuit. In the same way, during the writing, a switching circuit EST1, permits the writing of the digits D'1 to D'4 supplied by the marker circuit at the location of one of the four words.

FIG. 6 illustrates the circuit STD of FIG. 5, said circuit having been limited to the odd junctions because the circuit for the even junctions is identical. The signal F of the top of the figure appears if the signalling digit received Bl or $\overline{\mathrm{Bl}}$ corresponds to the expected digit. As it has been seen previously (Table 2), the expected digit will be 0 ($\overline{\mathrm{Bl}}$) if we have the code $\overline{\mathrm{S1}}$S2 for an incoming channel (S7) (condition $\overline{\mathrm{B1}}.\overline{\mathrm{S1}}$.S2.S7) or if we have the code S1$\overline{\mathrm{S2}}$ for an outgoing channel (S7) (condition $\overline{\mathrm{B1}}$.S1.$\overline{\mathrm{S2}}.\overline{\mathrm{S7}}$) ; in the same way, the expected digit will be 1 (Bl) if we have the code S1$\overline{\mathrm{S2}}$ for an incoming channel (S7) (condition B1.S1.$\overline{\mathrm{S2}}$.S7) or if we have the code $\overline{\mathrm{S1}}$S2 for an outgoing channel (S7) (condition B1.$\overline{\mathrm{S1}}$.S2.$\overline{\mathrm{S7}}$).

In the case of the code S1S2 which can appear only for an outgoing channel (signal ASW = S1.S2.S7), the expected digit is 0 or 1 according to the first digit received.

The signals F and ASW are used in combination with the signals S3, S4, T*rl*, T*l*, T3*l* and B*l* in order to determine the digits S3 and S4 to be written.

As has been stated previously, the method used consists in detecting a change if, among sixteen consecutive digits, two consecutive ones corresponding to the expected signal have not been detected. Therefore, no change will be decided as soon as two consecutive digits corresponding to the expected signal are received ; on the contrary, a change will be decided only after having received sixteen consecutive digits.

Table 3 summarizes the different possible cases of modification of the digits S3 and S4 read in the memory in relation with the said digits and of the signals F, ASW, B1, T1, T31, **T*rl*. The signals T31 and T*rl*** have been combined in such a way as the signal "T*rl*.$\overline{\mathrm{T31}}$" corresponds to a succession of signals of the fifteen first odd frames T1, T3 . . . T29. This table gives also in the last column the references of the AND circuits of the FIG. 6 which achieve the logical conditions.

This table is divided in three parts I, II, III according to the three codes 00, 01 and 10 (conditions $\overline{\mathrm{S3}}.\overline{\mathrm{S4}}$, $\overline{\mathrm{S3}}$.S4 and S3.$\overline{\mathrm{S4}}$) which are read in the memory and which can be modified by the circuit STD of FIG. 5, the code 11 (modification) cannot be modified. As has been seen previously stated (Table 2) the code 00 (condition $\overline{\mathrm{S3}}.\overline{\mathrm{S4}}$) means that there is a modification. In the case where the expected signalling is all 1 or all 0, the intermediary codes 01 and 10 mean, the one 01 (condition $\overline{\mathrm{S3}}$.S4) that the digit previously received was identical to the expected digit, the other one 10 (condition S3.$\overline{\mathrm{S4}}$) means that the digit previously received was different from the expected digit. In the case where the expected signalling is an alternation of 1 and of 0 (condition *ASW* = S1.S2.$\overline{\mathrm{S7}}$), the digit received during the frame T*l* will be considered as the expected digit and the intermediary code 01 (condition $\overline{\mathrm{S3}}$.S4) means then that the first digit received is a 0 whereas the code 10 (condition S3.$\overline{\mathrm{S4}}$) means that the first digit received is a 1. Owing to the different meaning of the intermediary codes 01 and 10 according to *ASW* = 0 or *ASW* = 1, each part I, II and III of table 3 has been divided into two parts a and b according to the signal ASW.

TABLE 3

| | S3 | S4 | F | ASW | B1 | T1 | Tr.T31 | T31 | S'3 | S'4 | References |
|---|---|---|---|---|---|---|---|---|---|---|---|
| I.a. | 0 | 0 | 1 | | | 1 | | | 0 | 1 | 9 |
| | 0 | 0 | 0 | 0 | | 1 | | | 1 | 0 | 1 |
| I.b. | 0 | 0 | | 1 | 1 | 1 | | | 1 | 0 | 2 |
| | 0 | 0 | | 1 | 0 | 1 | | | 0 | 1 | 10 |
| II.a. | 0 | 1 | 1 | | | | 1 | 1 | 0 | 0 | 11 and 12 |
| | 0 | 1 | 0 | 0 | | | 1 | | 1 | 0 | 3 and 12 |
| | 0 | 1 | 0 | 0 | | | | 1 | 1 | 1 | 3 |
| II.b. | 0 | 1 | | 1 | 1 | | 1 | 1 | 0 | 0 | 13 |
| | 0 | 1 | | 1 | 0 | | | 1 | 1 | 1 | 4 |
| III.a. | 1 | 0 | 1 | | | | 1 | | 0 | 1 | 5 and 7 |
| | 1 | 0 | 0 | 0 | | | | 1 | 1 | 1 | 8 |
| | 1 | 0 | 1 | 0 | | | | 1 | 1 | 1 | 8 |
| III.b. | 1 | 0 | | 1 | 0 | | 1 | 1 | 0 | 0 | 6 |
| | 1 | 0 | | 1 | 1 | | | 1 | 1 | 1 | 8 |

Owing to the method of interpretation which is used, if $ASW = 0$, we shall decide to make no modification if the preceding digit was identical to the expected digit (condition $\overline{S3}$.S4) and if the digit received is identical to the expected digit (signal $F = 1$) ; if, on the contrary, $ASW = 1$, we shall decide to make no modification if one of the digits received is different from the first digit received.

Table 3 will be read as follows :

at the first odd frame (T*l*), the code read is 00 and we shall write 01 if $F = 1$ (AND-circuit 9) or if $Bl = 0$ with $ASW = 1$ (AND-circuit 10) ; on the contrary, we shall write 10 if $F = 0$ with $ASW = 0$ (AND-circuit) 1) or if $Bl = 1$ with $ASW = 1$ (AND-circuit 2). The other lines of the table can be read in the same way ; thus, at the fifth line of the table, one will shift from code 01 to code 00 (no modification) at any odd frame if $F = 1$.

The squares of Table 3 in which no digit 0 or 1 appears mean that the corresponding signals are not used for the achievement of the logical condition.

The signals S'3, $\overline{S'3}$, S'4 and $\overline{S'4}$ are used for modifying, if required the digits S3 and S4 of the memory through the circuit EST2 of FIG. 5. This circuit EST2 is illustrated, as far as digit S3 is concerned, by FIG. 7, one will understand easily that the circuits for the digit S4 as well as the digits S3 and S4 corresponding to the channels of the even junctions are identical to the one of FIG. 5.

Two signals are necessary during the writing, vizus, a first signal N*s*I = $\overline{S1}$.S2 means that the signalling received on the channel must not be taken into account, any modification of the digits S3 and S4 is forbidden, a second signal DrI meaning that the odd junction to which the channel belongs is out of service ; in this last case, the writing of the code $\overline{S3}$.S4 is initiated. The digits S3 and S4 may also be modified by the marking circuit (conditions D'3.W6 and $\overline{\mathbf{D'3}}$.W6).

Table 2 shows also that the memory MST comprises two digits S5 and S6 intended for writing the signalling state to send on the odd junctions. FIG. 8 shows the decoding circuit of these two digits in the case of odd junctions. The signals resulting from this decoding are used for controlling circuits provided for elaborating the signalling signals.

We obtain the tone signal TN/I for S5.$\overline{S6}$, the signal ST/I has the value 1 when the digit to be sent is 1 ; thus in the case of the alternating of 0 and 1, the signal ST/I has only the value 1 for the frames T*r*3 (condition S6.T*r*3) and thus the value 0 for the frames T*r*l.

The digits S5 and S6, as it has just been seen, are used for indicating signalling to send on an outgoing channel, the signalling state to be sent having been written by the marker circuit. However, in certain types of signalling, it is sometimes necessary to transmit directly to the remote central exchange the signalling digits, i.e., the first digits Bl of each message received. It is thus foreseen in the central exchange described in relation with FIG. 4 that the $p = 8$ digits of the speech codes (including the signalling digit B*l*) which are read in the group data memory MDG should be written in the speech memory MDJ of the junctor. It is also foreseen to associate to the speech memory MDJ a memory of $g/2$ lines of two digits each ; each one of the two digits having the value 0 or 1 according to whether the signalling digit to be sent on the channel is B*l* or the one indicated by the digits S5 and S6. In each line of this additional memory the first digit has a meaning for the channel processed during the synchronous time slot whereas the second digit has a meaning for the channel processed during the asynchronous time slot.

While principles of the above invention have been described in connection with specific embodiments and particular modifications thereof, it is clearly understood that this description is made by way of example and not as a limitation of the scope of the invention.

What is claimed is:

1. A time division multiplex data switching central exchange employing pulse code modulation for receiving data on junctions in the form of messages of *p* digits duration in series, selected ones of the *p* digits of certain messages of each one of the channels containing information concerning the signalling states of the channel, said data switching central exchange comprising a switching network, P-junction group circuits connected to the inlets of the switching network and provided for carrying out a series-parallel conversion of the digits of the message of the channels of P-junctions, junctors connected to the output of the switching network, each junctor including a speech memory as well as a space path memory and a time path memory provided for setting up a connection between two channels, and a marker circuit connected to the junctors for up-dating the space and time path memories of the junctors in relation to the communications in course.

2. A detection and interpretation device of the signalling digits received according to claim 1 including a logic circuit for interpretation of the signalling digits, incorporating means for scanning a number of consecutive signalling digits on a same channel and determining whenever two consecutive digits corresponding to the expected signalling state have not been detected, the said expected state as well as the preceding digit received being written in the signalling memory.

3. An exchange as claimed in claim 1, in which a clock circuit is provided for delivering cyclic signals required for the operation of the circuits, the clock circuit including a detection and interpretation device for the signalling digits associated with each p junction group circuit.

4. A data switching central exchange according to claim 4 in which detection and interpretation devices for the signalling digits associated with each of a plurality of P-junction group circuits comprise: a first reading device for reading in a cyclic way the $g/2$ lines of a data memory of a group in which are written g messages received in the course of a cycle TR, the said reading means transmitting for recording in the two registers during a time $2TR/g$ two messages coming from two different junctions of the group; a signalling memory with $g/2$ lines each line of which contains, in the form of a binary word, the information required for the processing of the channels of two different junctions of a P-junction group; a second reading device reading in a cyclic way the $g/2$ lines of the signalling memory; a third reading device reading the signalling memory between the instants reserved to the cyclic reading, said device being controlled by the data processing machine which controls the central exchange; an interpretation logic circuit of the signalling digits received which receives at each cyclic reading time, on the one hand, the signalling digit of each one of the two messages stored in the two registers associated to the group data memory, and on the other hand, a part of the binary word stored in a line of the signalling memory, the said part of the binary word corresponding to the two channels the messages of which are stored in the registers associated with the group data memory; a first cyclic writing device of the signalling memory modifying, if required, certain digits of the binary words in relation with the output signals of the interpretation logic circuit of the signalling signals received and of the signals supplied by the P-junction group circuit; a second writing device including means for modifying any digit of the binary words contained in the signalling memory between the instants reserved to the cyclic writing, the said device being controlled by the data processing machine which controls the data switching central exchange; and a logic circuit receiving, at each cyclic reading time, the second part of the binary word contained in the line of the signalling memory, the said part of the binary word corresponding to the signalling signals to be sent on two channels of the circuit of the P-junction group.

* * * * *